(12) United States Patent
Rutherford et al.

(10) Patent No.: US 6,667,100 B2
(45) Date of Patent: *Dec. 23, 2003

(54) ULTRA-THIN FLEXIBLE EXPANDED GRAPHITE HEATING ELEMENT

(75) Inventors: Robert B. Rutherford, Kirtland, OH (US); Richard L. Dudman, Euclid, OH (US)

(73) Assignee: EGC Enterprises, Inc., Chardon, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/144,493

(22) Filed: May 13, 2002

(65) Prior Publication Data

US 2003/0211314 A1 Nov. 13, 2003

(51) Int. Cl.⁷ .................................................. B32B 9/00
(52) U.S. Cl. ...................... 428/408; 428/174; 428/336; 219/200; 219/552; 156/230; 156/273.9; 156/308.2
(58) Field of Search ................................. 428/408, 332, 428/336, 174; 219/200, 541, 552; 156/60, 230, 273.9, 308.2

(56) References Cited

U.S. PATENT DOCUMENTS

| | | | |
|---|---|---|---|
| 3,404,061 A | 10/1968 | Shane et al. ................. | 161/125 |
| 3,553,834 A | 1/1971 | Olstowski et al. ............ | 29/611 |
| 4,107,019 A | 8/1978 | Takao et al. ............. | 204/195 S |
| 4,659,912 A | 4/1987 | Derbyshire .................. | 219/535 |
| 5,100,737 A | 3/1992 | Colombier et al. ......... | 428/612 |
| 5,155,340 A | 10/1992 | Morita et al. ................ | 219/543 |
| 5,198,063 A | 3/1993 | Howard et al. ............. | 156/282 |
| 5,569,474 A | 10/1996 | Kitaichi et al. ............. | 425/547 |
| 5,705,793 A | 1/1998 | Kitaichi et al. ............. | 219/544 |
| 5,756,991 A | 5/1998 | Risinger et al. ......... | 250/252.1 |
| 6,245,400 B1 | 6/2001 | Tzeng et al. ................ | 428/40.1 |
| 6,254,993 B1 | 7/2001 | Mercuri ...................... | 428/408 |

Primary Examiner—Deborah Jones
Assistant Examiner—Abraham Bahta
(74) Attorney, Agent, or Firm—Jones Day

(57) ABSTRACT

An ultra-thin flexible expanded graphite heating high resistance element is produced by a method including the steps of providing a flexible expanded graphite sheet having a surface adhered to a substrate; pulling apart the sheet and the substrate with a force sufficient to separate the adhered flexible expanded graphite sheet into a removed layer and a remainder layer adhered to the substrate; and optionally repeating the foregoing steps until the remainder layer has a thickness of about 0.01 mils to about 2 mils. A resistance heater for high voltage applications is also provided.

27 Claims, 10 Drawing Sheets

ULTRA-THIN FLEXIBLE EXPANDED GRAPHITE HEATING ELEMENT

BACKGROUND OF THE INVENTION

The design and manufacture of resistance heating elements depends on the wattage required for a given application and the corresponding resistance determined by Ohm's Law which states that for any circuit the electric current is directly proportional to the voltage and is inversely proportional to the resistance. However, limitations on voltage and current must be observed, subject to the capacity of the power source and safety considerations. For example, a high voltage (e.g., 110, 240 or 480 volts alternating current, VAC) can produce a very high current unless the resistance of the heating element is also very high.

Flexible expanded graphite sheet has a relatively high resistivity along its length and width, and excellent heat conducting and electrical conducting properties that are well suited for use in low voltage heater applications. However, the usefulness of this material for high voltage heater applications has been limited because of the unavailability of flexible expanded graphite heating elements having a sufficiently high electrical resistance.

A variation in the length, width and/or thickness of flexible expanded graphite sheet of a given density can change, by a large magnitude, the electrical resistance and, consequently, the amount of electric current that will flow through the material. For a given length and width, an increase in the thickness of a flexible expanded graphite sheet results in a decrease in the electrical resistance and a higher current flow. For high voltage applications that require high resistance it is therefore desirable to use a flexible expanded graphite heating element that is as thin as possible. However, commercially produced flexible expanded graphite sheet, having densities ranging from 50 to 90 lbs./ft$^3$, is available in thicknesses of 3 to about 60 mils, with a thickness of 15 mils the most common. Flexible expanded graphite sheet having a minimum thickness of 3 mils does not provide a sufficiently high electrical resistance for many high voltage heater applications.

SUMMARY OF THE INVENTION

Unexpectedly, it has been discovered that the thickness of a flexible expanded graphite sheet of any density can be substantially decreased to produce a thinner flexible expanded graphite sheet having any desired thickness. Ultra-thin flexible expanded graphite sheets (e.g., having a thickness of about 2 mils or less) produced by the methods of the invention are particularly useful as, but not limited to, electrical resistance heater elements or electrical strip heaters for high voltage heater applications.

In one embodiment of the invention, an ultra-thin flexible expanded graphite heating element is produced by a method comprising the steps of (a) providing a flexible expanded graphite sheet having a surface adhered to a substrate; (b) pulling apart the sheet and the substrate with a force sufficient to separate the adhered flexible expanded graphite sheet into a removed layer and a remainder layer adhered to the substrate; and (c) optionally repeating steps (a) and (b) until the remainder layer has a thickness of about 0.01 mils to about 2 mils.

In another embodiment of the invention, an ultra-thin flexible expanded graphite heating element is produced by a method comprising the steps of (a) providing a flexible expanded graphite sheet having a top surface, and a bottom surface adhered to a first substrate; (b) adhering a second substrate to the top surface; (c) separating the first and second substrates with a force sufficient to separate the flexible expanded graphite sheet into a first remainder layer adhered to the first substrate and a second remainder layer adhered to the second substrate; and (d) optionally repeating steps (a), (b) and (c) until at least one of the remainder layers has a thickness of about 0.01 mils to about 2 mils.

In each of the embodiments described above, the resulting remainder layer of flexible expanded graphite sheet can have a substantially uniform thickness, particularly if the second substrate is uniformly adhered to the top surface. A combination of the above embodiments can also be employed to obtain a remainder layer having a desired thickness.

In another embodiment, a method according to the invention produces a layer on a substrate of flexible expanded graphite sheet that is non-uniform in thickness. A non-uniform thickness of the sheet can be useful in many applications but is especially useful in heater element applications when it is desired to provide a variation in current through different parts of the element. An ultra-thin flexible expanded graphite heating element having a non-uniform thickness is produced by a method comprising the steps of (a) providing a flexible expanded graphite sheet having a top surface, and a bottom surface adhered to a first substrate; (b) non-uniformly adhering a second substrate to the top surface; (c) separating the first and second substrates with a force sufficient to separate the flexible expanded graphite sheet into a first remainder layer adhered to the first substrate and a second remainder layer adhered to the second substrate; and (d) optionally repeating steps (a), (b) and (c) until at least a portion of one of the remainder layers has thickness of about 0.01 mils to about 2 mils.

A combination of this method with the above-described embodiment that does not employ a second substrate can also be used to obtain a sheet that is non-uniform in thickness.

An ultra-thin flexible expanded graphite sheet produced by any of the embodiments of the methods of the invention can have any desired thickness and can retain the density of the original flexible expanded graphite sheet. Optionally, the remainder layer produced by any of the methods can be pressure rolled as a finishing process to recompress the dendritic surface of the graphite to provide surface uniformity. If desired, the remainder layer can be sufficiently compressed by rolling or pressing to produce a thinner and denser graphite. Preferably, the flexible expanded graphite sheet comprises a heating element having a thickness that is suitable for a high voltage heater application. For example, the thickness of the sheet produced by a method according to the invention can be about 0.01 mils to about 2 mils, preferably about 0.01 mils to about 1.5 mils, more preferably about 0.01 mils to about 1 mils, especially about 0.01 mils to about 0.4 mils, and more especially about 0.01 mils to about 0.1 mils, and the like, depending on the heater application for which it is to be used.

Ultra-thin flexible expanded graphite remainder layers produced by any of the embodiments of the invention are adhered to a substrate. The substrate itself can be electrically insulating; however, a non-insulating substrate can be adhered to an insulating substrate prior to use of the flexible expanded graphite as a heating element.

The invention further provides a resistance heater for high voltage applications, comprising an electrically insulating substrate; a flexible expanded graphite sheet having a thickness of about 0.01 mils to about 2 mils; a power source; and a connector for supplying power from the power source to the flexible expanded graphite sheet.

DETAILED DESCRIPTION OF THE INVENTION

Figure 1:
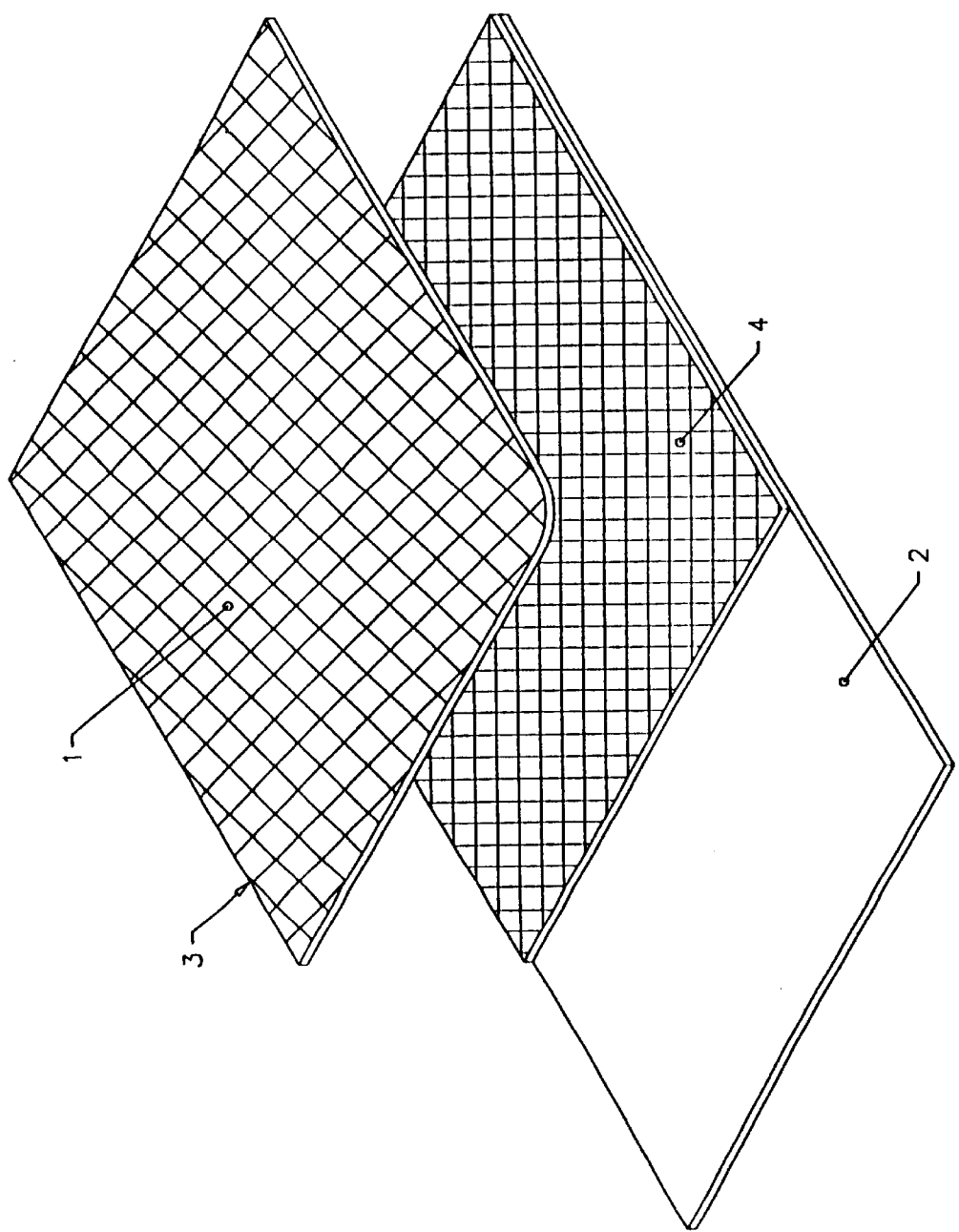
FIG. 1 illustrates a "one-layer" method for decreasing the thickness of a flexible expanded graphite sheet.

Flexible expanded graphite is produced from natural graphite particles that are made up of layer planes of hexagonal arrays of carbon atoms that are substantially flat and oriented so as to be substantially parallel and equidistant to one another. Natural graphite can therefore be characterized as laminated structures consisting of superposed layers of carbon atoms joined together by weak van der Waals forces and with a high degree of orientation. In considering the graphite structure, two directions are usually noted, the "c" axis or direction and the "a" axes or directions. The "c" axis is the direction perpendicular to the carbon layers; the "a" axes are the directions parallel to the carbon layers. A process for producing flexible expanded graphite from natural graphite is disclosed, for example, in U.S. Pat. No. 3,404,061.

Briefly, particles of natural graphite are treated with an intercalant of, e.g., a solution of sulfuric and nitric acid, and the intercalated graphite particles are then exposed to high temperature (e.g., greater than 700° C. Upon this exposure, the spacing between the superposed carbon layers is appreciably opened up so as to provide a marked expansion in an accordion-like fashion to at least 80 or more times its original volume in the "c" direction (thickness) dimension. The voluminous expansion of the graphite, without the use of a binder, is believed to be possible due to the excellent mechanical interlocking, or cohesion that is achieved between the graphite particles. The exfoliated graphite particles are worm-like or vermiform in appearance. The worms are then compressed and subsequently can be roll pressed into a densely compressed flexible graphite sheet or foil of desired density and thickness and substantially increased anisotropy with respect to electrical resistivity and other physical properties. The flexible expanded graphite sheet is essentially pure graphite, typically well over 90 percent carbon by weight, with a highly aligned structure. Only naturally occurring minerals remain as part of the product in the form of metal salts, usually referred to as ash.

It is conventional to compress the exfoliated worms in stages with the product of the first or early stages of compression being a flexible graphite mat having a density of about 3 to 10 lbs./ft$^3$ and a thickness of from 0.1 to 1 inch. The flexible graphite mat can further be compressed by roll pressing into a standard density sheet or foil of preselected thickness. A flexible graphite mat thus can be compressed to a thin sheet of between 2 and 180 mils in thickness. The sheet material can be die cut into sizes and shapes suitable for a variety of applications. The density and thickness of the sheet material can be varied by controlling the degree of compression. For example, the density of the rolled sheet material can range from about 5 lbs./ft$^3$ to about 137 lbs./ft$^3$, which is near the theoretical density of graphite.

Commercially available flexible expanded graphite sheet has a density of 50 to 90 lbs./ft.$^3$, typically 70 lbs./ft.$^3$, and a thickness of 3 mils to about 60 mils. The sheet has a thermal conductivity along the length and width of about 140 W/M° K. at 21°F. and about 5 W/M°K. through the thickness. The electrical resistivity of flexible expanded graphite foil sheets having densities of 50 to 90 lbs./ft.$^3$ and thicknesses in a range of 5 mils to 30 mils were measured previously and found substantially to comprise a value of 2.0–6.7×10$^{-4}$ ohm-in., as disclosed in U.S. Pat. Nos. 6,237,874 and 6,279,856, the disclosures relating to resistivity incorporated herein by reference.

The methods of the invention for decreasing the thickness of a flexible expanded graphite sheet take advantage of the laminated structure of the sheet that makes it possible to peel or pull away layers of the sheet. The flexible expanded graphite sheet that is to be decreased in thickness can have any original thickness, including a thickness of 3 mils to about 60 mils, such as foil sheets that are commercially available; however, the original thickness can be greater than 60 mils, such as 60 mils to about 180 mils. The original thickness can also be less than 3 mils, such as about 2 mils. However, this thickness is not commercially available.

In one embodiment of the invention, the "one-layer" method illustrated in FIG. 1, a flexible expanded graphite sheet 1 having a surface adhered to a substrate 2 is provided. To decrease the thickness of the sheet 1, the sheet and the substrate are pulled apart with a force sufficient to separate the adhered flexible expanded graphite sheet into a removed layer 3, and a remainder layer 4 that remains adhered to the substrate 2. The thickness of the remainder layer 4 can vary from about 5% to about 95% of the original thickness of the foil sheet 1, preferably about 25% to about 75%, more preferably about 40% to about 60% and, especially about 50% of the original thickness. Optionally, the steps of the method can be repeated as often as necessary, with each successive remainder layer serving as the "original" flexible expanded graphite sheet having a thickness and a surface adhered to the substrate, until a thickness of the remainder layer of about 0.01 mils to about 2 mils is obtained. Thus, regardless of the thickness and density of the original flexible expanded graphite sheet 1, the thickness of the final remainder layer can be decreased to about 0.01 mils to about 2 mils.

Figure 2:
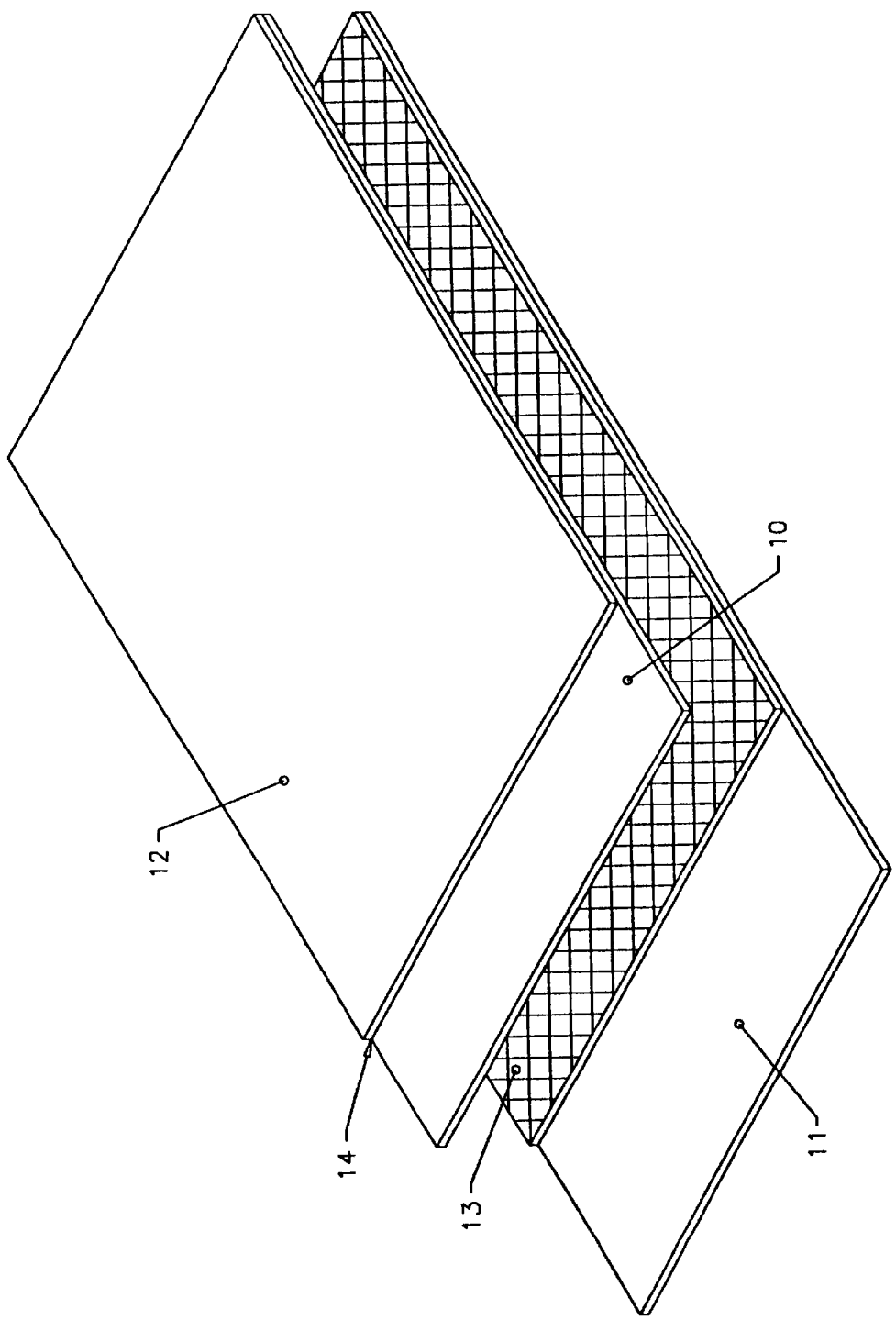
FIG. 2 illustrates a "two-layer" method for decreasing the thickness of a flexible expanded graphite sheet.

Another embodiment of the invention, the "two-layer" method, is illustrated in FIG. 2. In this method, a flexible expanded graphite sheet 10 is sandwiched between and adhered to two substrates 11 and 12. That is, the sheet 10 has a bottom surface adhered to a first substrate 11 and a top surface adhered to a second substrate 12. To decrease the thickness of the sheet 10, the two substrates 11 and 12 are separated with a force sufficient to separate the flexible expanded graphite sheet 10 into a first remainder layer 13 that remains adhered to the first substrate 11, and a second remainder layer 14 that remains adhered to the second substrate 12.

The thicknesses of each of the remainder layers 13 and 14 are independent of each other and are variable. Usually, the thicknesses of the remainder layers 13 and 14 are independently about 5% to about 95% of the original thickness of the foil sheet 10, preferably about 25% to about 75% and, more preferably, about 40% to about 60% of the original thickness, especially about 50% of the original thickness. Optionally, the steps of the method can be repeated as often as necessary, with each of the remainder layers 13 and 14 serving independently as the "original" flexible expanded graphite sheet having a thickness and a bottom surface adhered to a substrate. Thus, by adhering a new substrate to a top surface of a remainder sheet, and repeating the separation of the substrates, two subsequent remainder layers are obtained, each thinner than the original remainder layer.

The steps of the method can be repeated until a remainder layer thickness of about 0.01 mils to about 2 mils is obtained. Moreover, each of the remainder layers 13 and 14, or any of the subsequent remainder layers obtained by the two-layer method, can serve independently as the "original" flexible expanded graphite sheet in the one-layer method. Correspondingly, a remainder layer obtained in the one-layer method can serve independently as the original flexible expanded graphite sheet in the two-layer method.

Regardless of the thickness of the original flexible expanded graphite sheet the thickness of the flexible expanded graphite sheet layer can be decreased to the desired thickness by the one-layer method, the two-layer method, or combinations of the methods.

In the methods of the invention, the step of providing the sheet having a surface adhered to a substrate can include the substep of adhering a flexible expanded graphite sheet to a substrate. Moreover, the sheet having a surface adhered to a substrate optionally can have an edge not adhered to the substrate, so as to provide a convenient means for engagement of the foil and/or the substrate for applying the pulling force. However, the presence of an unadhered edge of the sheet is not critical to the methods of the invention.

The force sufficient to pull apart the sheet and the substrate, and/or to separate the two substrates, varies with the density of the original adhered flexible expanded graphite sheet, a greater density requiring more force. A sheet adhered to a substrate can be separated into a removed layer and a remainder layer by manually pulling a layer of the foil away from the adhered foil, or by manually separating the two substrates adhered to the foil. For denser sheets, if more force than manual separation force is required, a suitable mechanical device to engage the foil and/or the substrate and exert a sufficient separating force can be used.

Optionally, the remainder layer produced by any of the methods can be pressure rolled as a finishing process to recompress the dendritic surface of the graphite to provide surface uniformity. If desired, the remainder layer can be sufficiently compressed by rolling or pressing to produce a thinner and denser graphite.

The substrates employed in the embodiments of the methods can be used independently of each other, especially in methods employing more than one substrate. For example, the first substrate to which a flexible expanded graphite sheet is adhered can be the same as or different than one or more additional substrates employed in a method embodiment. Suitable substrates for use in embodiments of the method can include substantially electrically non-conductive or electrically conductive, flexible or non-flexible substrates. An ultra-thin flexible graphite sheet remainder layer employed as a resistance heater element can be adhered to an electrically non-conductive substrate. Alternatively, the remainder layer can be adhered to an electrically conductive substrate which then can be further adhered to an electrically insulating material.

Electrically non-conductive substrates can include, but are not limited to, polymers such as polyethylenes, polyvinyl chloride, cellulose derivatives, vinyl resins, polystyrenes, polyamides, polyimides, polycarbonates, and acrylic resins such as polymethyl methacrylate, and the like; paper; rubber; mica tape, plate or sheet; glass cloth; glass articles; ceramics such as alumina, mullite, spinel, forstserite and ceramic fiber scrim; and the like. Polymer substrates can be employed in the form of a film. The thickness of the film is not critical to the methods according to the invention. Exemplary suitable electrically non-conductive substrates include, but are not limited to, Kapton®, Nomex® and Mylar® (E.I. duPont de Nemours Co.).

Suitable electrically conductive substrates include, but are not limited to, metal rods, bars, sheets, foils (e.g., aluminum, magnesium, copper, molybdenum, iron, nickel, silver and titanium), and the like.

Adhering of the flexible expanded graphite sheet to a substrate can be by mechanical, chemical or thermal bonding. For example, conventional organic or inorganic adhesives can be employed and can include for example, rubber cements, animal glues, sodium silica solutions, epoxy resins, phenol formaldehyde resin, and the like, or other commonly available cementing or bonding agents. Such adhesives are particularly useful for adhering flexible expanded graphite sheet to electrically conductive substrates, such as metals, and can be used for virtually any of the electrically non-conductive substrates. Many polymer films having a sticky adhesive substance already applied are commercially available and are well known to those skilled in the art. A convenient method for applying a thin essentially continuous coating of graphite onto a substrate is to first coat the substrate with a tacky adhesive or bonding agent, and then to rub or press the flexible expanded graphite onto the adhesive layer. The coating of the adhesive or bonding agent can be continuous or non-continuous. It is possible to deposit a layer of adhesive that is continuous in a plane by coating or spraying. However, it can be preferable to have a layer of adhesive that is discontinuous but regularly distributed, such as in the form of a grid, or any other pattern including stripes, serpentine pattern, and the like.

When the polymer substrates do not have useful adhesion properties, the bonding between the surface of the flexible expanded graphite and the substrate can be accomplished by the use of thermal bonding. For example, a thermoplastic polymer film can be fusionbonded to a sheet of flexible expanded graphite by raising the temperature of one side of the film to its softening point at the interface engaging the flexible expanded graphite sheet to cause the film to bond to the sheet, while the opposite side of the film is maintained at a temperature below its softening point. Such methods are well known and one such method for adhering a flexible expanded graphite sheet to a substrate is disclosed, for example, in U.S. Pat. No. 5,198,063.

The desired thickness of the ultra-thin flexible expanded graphite sheet adhered to a substrate as a final remainder layer depends on the high voltage resistance heater application for which it is to be used. Preferably, the thickness of the sheet is about 2 mils. However, the thickness of the sheet can be, but is not limited to, about 0.01 mils to about 1.5 mils, preferably about 0.01 mils to about 1 mils, more preferably about 0.01 mils to about 0.4 mils, and especially about 0.01 mils to about 0.1 mils.

Figure 3:
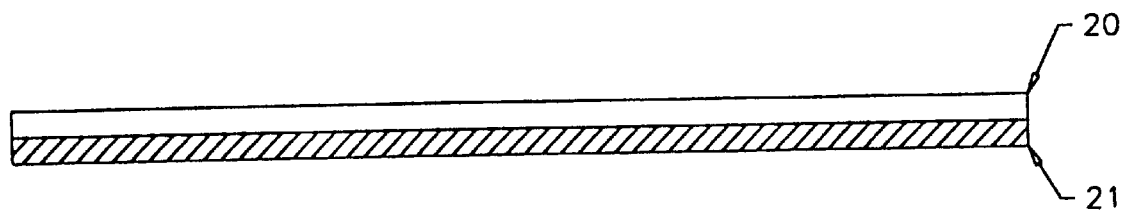
FIG. 3 illustrates a flexible expanded graphite sheet produced by the one-layer method or the two-layer method, or a combination of the methods, and having a substantially uniform thickness.

The thickness of ultra-thin flexible expanded graphite sheet adhered to a substrate as a remainder layer can be substantially uniform or non-uniform. A remainder layer 20 having a uniform thickness and adhered to a substrate 21 is illustrated in FIG. 3. A non-uniform thickness of the sheet can be useful in high voltage heater element applications when it is desired to provide a variation in current through different parts of the element. A non-uniform sheet preferably is produced by the two-layer method, as described below; although it can also be produced by the one-layer method by selectively pulling a layer of the sheet from the sheet adhered to the substrate in only desired areas of the adhered sheet.

Figure 4:
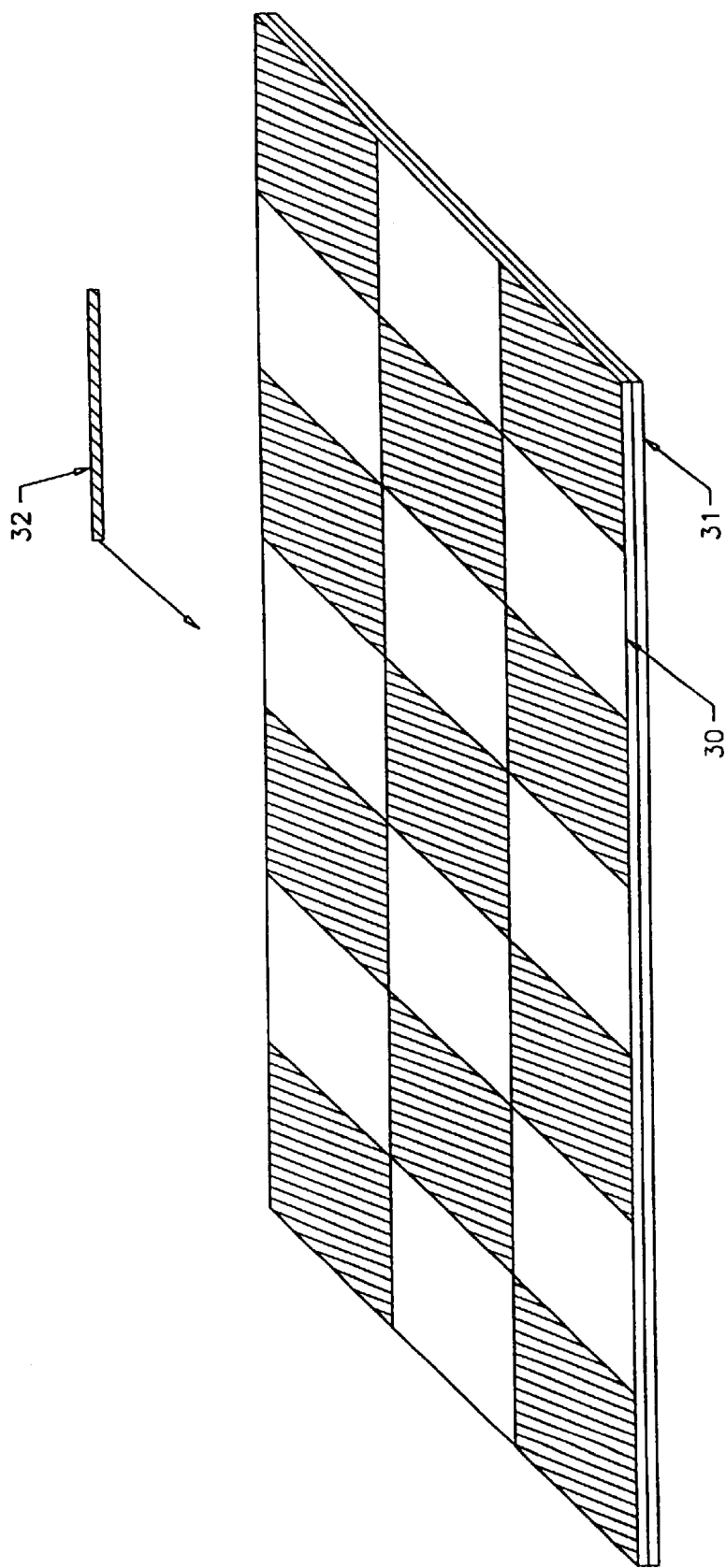
FIG. 4 illustrates a method for producing a flexible expanded graphite sheet having a non-uniform thickness.
Figure 5:
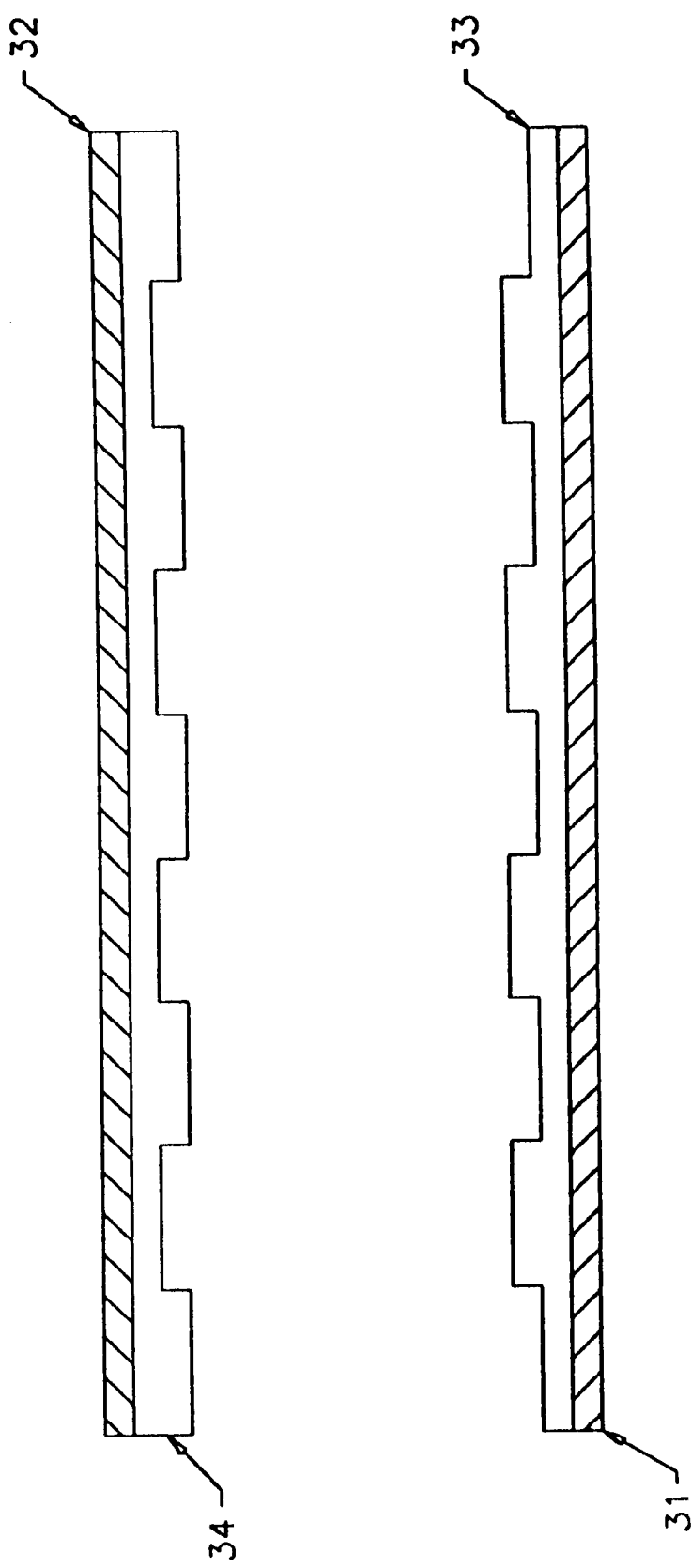
FIG. 5 illustrates a flexible expanded graphite sheet having a non-uniform thickness, produced by a method according to FIG. 4.

To produce a non-uniform sheet by the two-layer method, the second substrate is adhered to the first remainder layer 30 adhered to the first substrate 31 in a discontinuous manner, as illustrated in FIG. 4. For example, an adhesive can be applied in the form of a pattern on the first remainder area and the second substrate 32 is then adhered to the top surface of the remainder sheet at the points of contact with the adhesive. As illustrated in FIG. 5, when the second substrate and first substrate are separated from each other, the layers of the flexible expanded graphite are separated, forming first and second remainder layers 33 and 34 having patterns of non-uniform thicknesses that are substantially mirror images.

Figure 6:
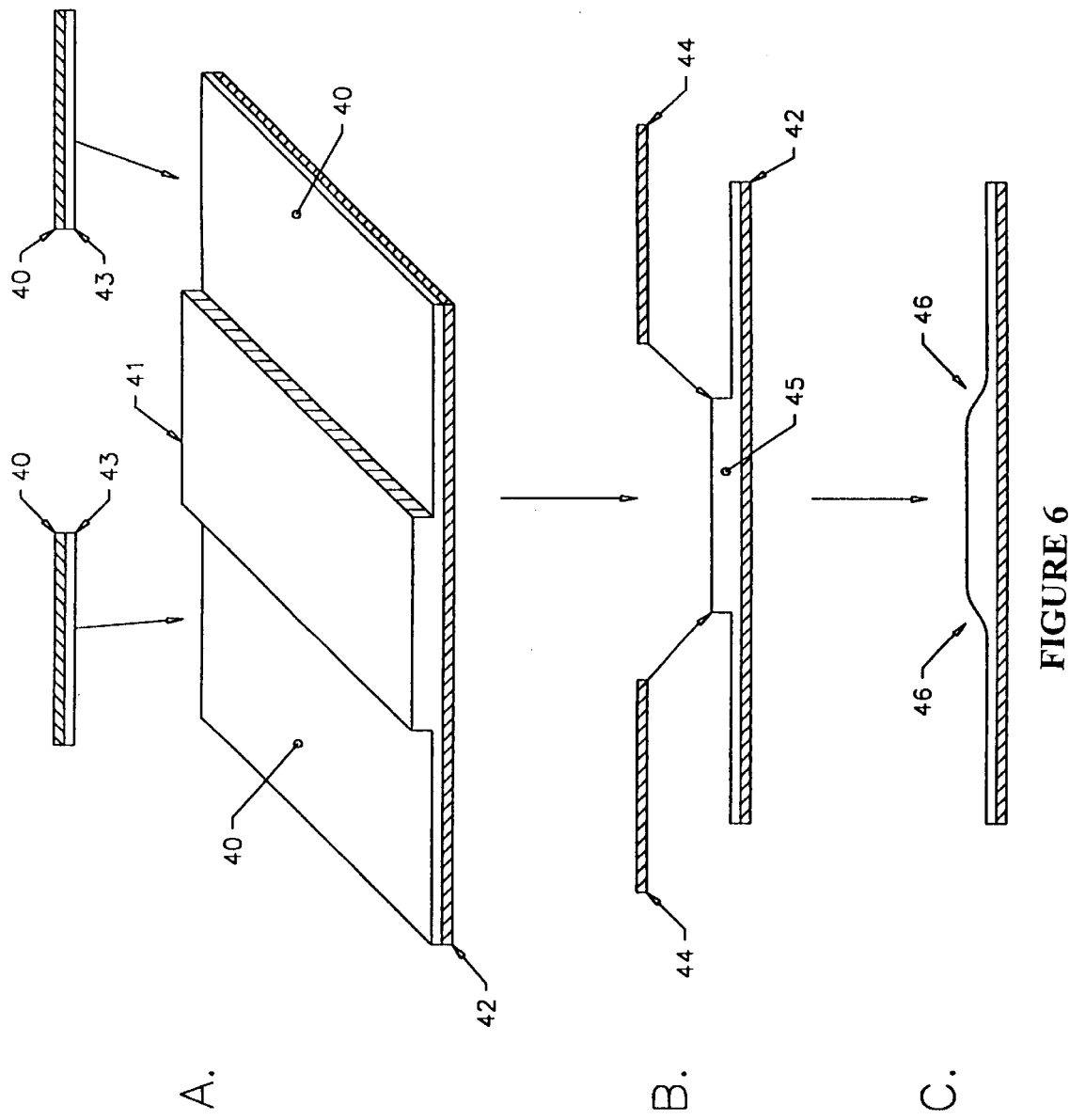
FIG. 6 illustrates another embodiment of a flexible expanded graphite sheet having a non-uniform thickness, that can be produced by the two-layer method or a combination of the one-layer method and the two-layer method.

As illustrated in FIG. 6A an adhesive and second substrate 40 can be applied in selected areas of the original and/or remainder layers 41 adhered to the first substrate 42. Separation of the substrates removes a layer of the original/remainder 43 resulting in a pattern, such as that illustrated in FIG. 6B. An adhesive and third substrate 44 can then be applied to only selected areas of the remainder layer 45. This can be repeated, if desired, to form shoulder areas 46, such as those illustrated in FIG. 6C, that provide a thickness gradient. It is envisioned that any pattern or shape of non-uniform thicknesses can be obtained by this method. Alternatively, a combination of the two-layer method and the one-layer method can produce substantially the same results.

By the methods of the invention, the flexible expanded graphite foil sheet adhered to the substrate as a remainder layer comprises a single, monolithic heating element, either having a uniform thickness or a non-uniform thickness that can be shaped or sculptured in such a way as to vary the resistances and, therefore, the watt densities in various parts of the heating element in a predetermined manner. As described above, for a given length and width, a section of the heating element comprising a greater thickness of flexible expanded graphite foil has a lesser electrical resistance, a greater flow of current, and becomes hotter than sections in which the foil layer is thinner.

Figure 9:
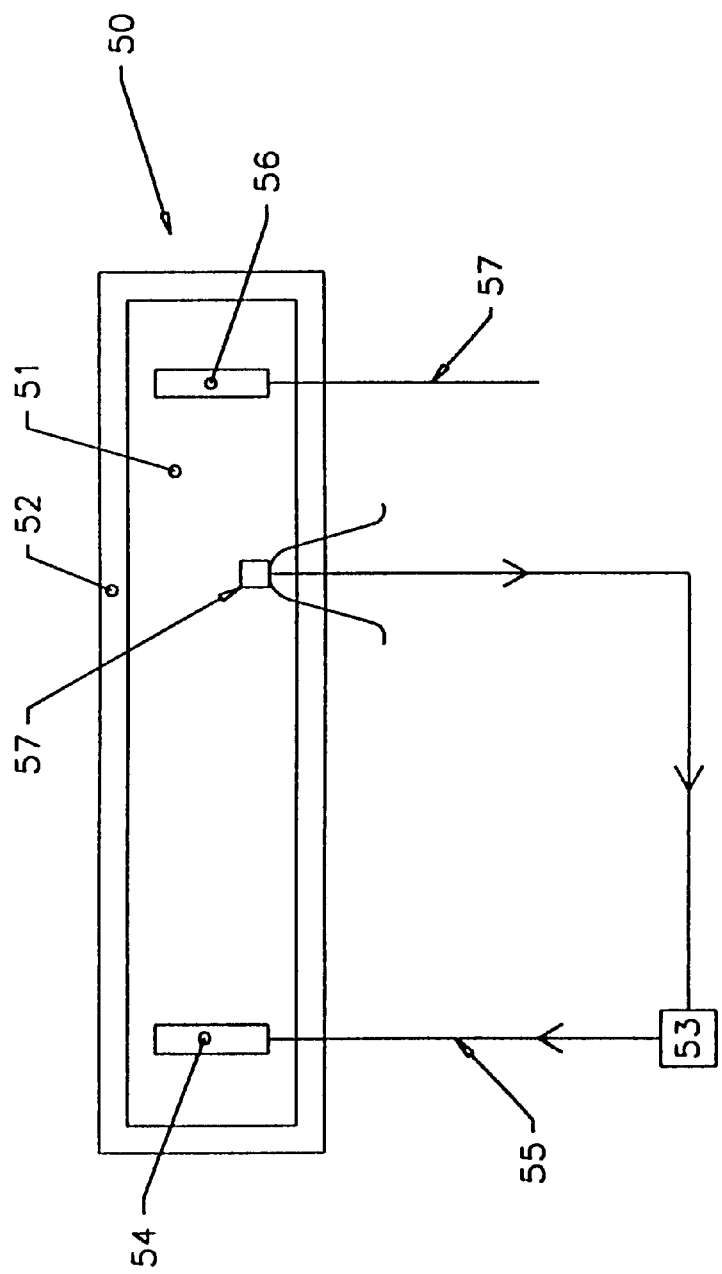
FIG. 9 is a schematic illustration of an electrical resistance heater employing an ultra-thin flexible expanded graphite heating element according to the invention.

As illustrated in FIG. 9, a resistance heater 50 for high voltage applications comprises the flexible expanded graphite foil 51 of a desired uniform or non-uniform thickness in the range of about 0.01 mils to about 2 mils adhered to a substrate 52, that is preferably an electrically insulating substrate. The flexible expanded graphite sheet is connected to a power source 53 by, for example, using an edge connector or bus bar 54 and wiring system 55. Another edge connector or bus bar 56 is present to supply a ground for the electrical circuit. Thus, the flexible expanded graphite foil layer 51 is preferably connected to the power source by a single set of two electrical terminals; although it is possible to use more than one set of terminals, depending on the heater application for which it is to be used. A current is transmitted through the foil by establishing a voltage differential between the terminals, resulting in heating of the foil. The amount of heat generated can optionally be measured in one or more areas of the heater by a temperature sensor 57, such as one or more thermocouples of known types.

Figure 10:
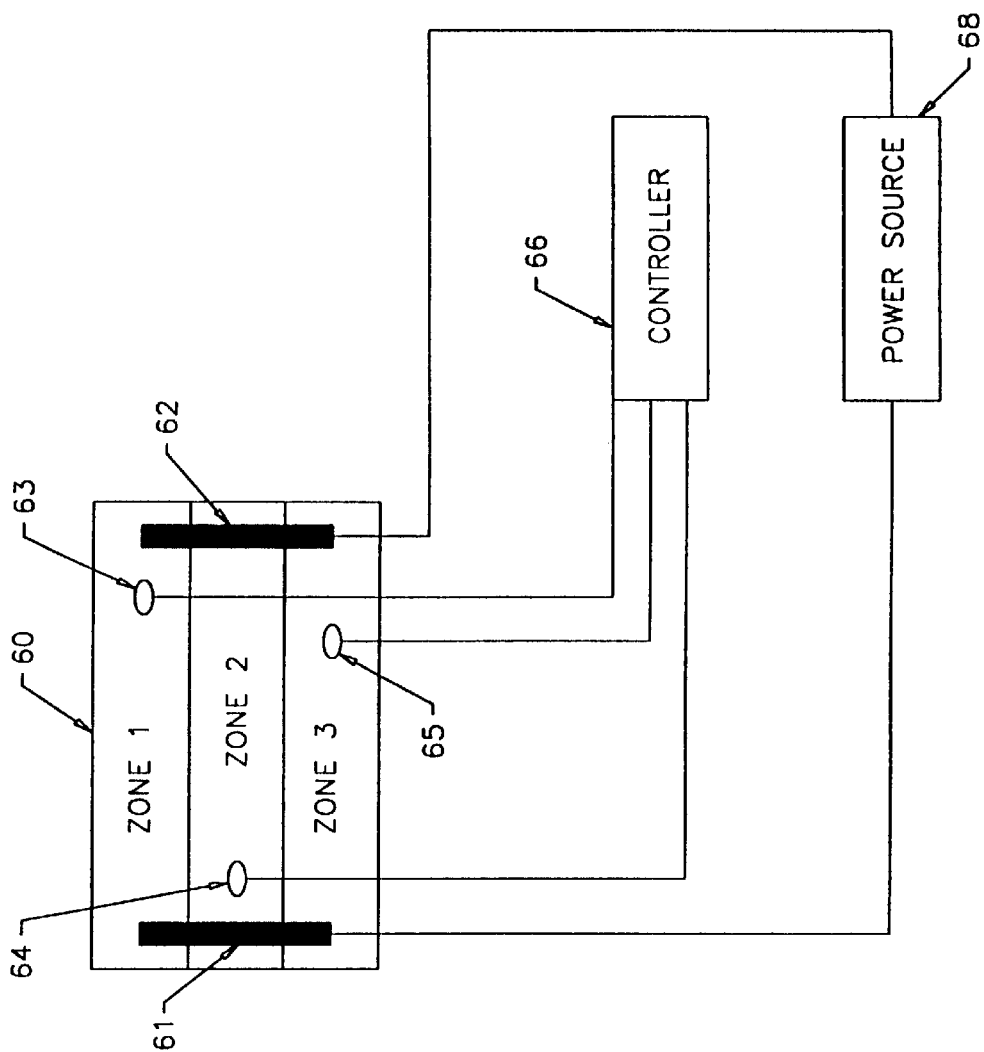
FIG. 10 is another schematic illustration of an electrical resistance heater employing a non-uniform thickness ultra-thin flexible expanded graphite heating element according to the invention.

FIG. 10 illustrates an embodiment of an electrical resistance heater where the flexible expanded graphite foil has a non-uniform thickness. Zones 1, 2 and 3 are areas of flexible expanded graphite heater element in which the foil sheet layer 60 can have different thicknesses. Regardless of the configuration of the flexible expanded graphite layer, the zones can be connected to the power source by a single set of two electrical terminals 61 and 62. Temperature sensors 63, 64 and 65 are optionally placed in zones 1, 2 and 3, respectively. The temperature sensors can communicate the temperatures in each of the zones and communicate in real time with an optional power controller 66. The controller can be programmed to control the amount of power from the power source 68 that is supplied to the terminal 61 to control the temperature of the heater.

EXAMPLES

The following examples illustrate certain advantages of ultra-thin flexible expanded graphite sheets, produced by embodiments of the methods of the invention, as resistance heater elements for high voltage applications. The examples have been provided merely to demonstrate the practice of the subject invention and do not constitute limitations of the invention. Those skilled in the art can readily select other wattages, voltages, lengths, widths and thicknesses, and the like, according to the disclosure made herein above. Thus, it is believed that any of the variables disclosed herein can readily be determined and controlled without departing from the scope of the invention herein disclosed and described.

By Ohm's Law:

Power (watts)=$I^2$ (amps)×$R$ (ohms)

Power=$I$×$V$ (voltage)

$I=V/R$ and $R=V/I$

Power=$V^2/R$ where I=Current, R=Resistance and V=Voltage.

The required resistance of a flexible expanded graphite foil sheet having a given length and width, used as a heating element, determines the thickness requirement of the sheet. It is known that the electrical resistivity of the foil sheet varies with the density, and the resistance along a given length and width of the foil sheet varies with the thickness. Therefore, the required thickness of flexible expanded graphite foil sheet having a known resistivity, density, length (L) and width (W) can be calculated, as follows, where A is the cross-sectional area (W×thickness, t) of the foil sheet:

$$L/A \times \text{volume resistivity} = \text{resistance} (R)$$

Example 1

A flexible expanded graphite foil sheet having volume resistivity of $3.1 \times 10^{-4}$ ohm-in. and a length and width of 18 in. and 4 in., respectively, is used as a heating element in a heater requiring 10 watts/in.$^2$ and run at 110 VAC. The total wattage is 720 watts. From the above equations:

$720 = I \times E$ where $E = 110$ volts $I = 6.54$ amps $720 = (6.54)^2 \times R$ $R = 16.82$ ohms $18/A \times 3.1 \times 10^{-4} = 16.82$ $A = (18 \times 3.1 \times 10^{-4})/16.82$ $A = 0.00033$ in$^2$ $A = w \times t$ $t = A/w$ $t = 0.08$ mils When the dimensions of the flexible expanded graphite foil are changed to 36 in.×2 in., in the same scenario as above, the required thickness is $A = (36 \times 3.1 \times 10^{-4})/16.82$ $A = 0.00066$ $t = 0.33$ mils When the voltage is increased to 220 VAC and the dimensions of the flexible expanded graphite foil are 36 in.×2 in, in the same scenario as above, the required thickness is:

$720 = I \times E$ where $E = 220$ volts $I = 3.27$ amps $720 = (3.27)^2 \times R$ $R = 67.22$ ohms $36/A \times 3.1 \times 10^{-4} = 67.22$ $A = (36 \times 3.1 \times 10^{-4})/67.22$ $A = 0.00016$ in$^2$ $A = w \times t$ $t = A/w$ $t = 0.08$ mils Similarly, using a voltage of 440 VAC and a dimension of the flexible expanded graphite sheet of 72 in.×1 in., the required thickness is 0.08 mils.

Example 2

Comparison Example

A flexible expanded graphite foil sheet having a volume resistivity of $3.1 \times 10^{-4}$ ohm-in., a length and width of 18 in. and 4 in., respectively, and a thickness of 3 mils, is proposed for use as a heating element in a heater requiring 10 watts/in.$^2$. The total required wattage is 720 watts.

From the above equations, the resistance of the heating element is 0.465 ohms. According to the calculations, when 110 VAC is applied to this heating element, the flexible expanded graphite heater will use about 237 amps and produce about 26,022 watts, both unrealistic numbers. Therefore, this flexible expanded graphite heating element does not produce a sufficiently high resistance for use in this high voltage application.

Example 3

A flexible expanded graphite sheet having a density of 70 lbs./ft$^3$, a length and width of 18 in. and 4 in., respectively, and a thickness of 5 mils, was adhered to a Kapton® Type HN film having a thickness of 2 mils, by an adhesive silicone coating having a thickness of 1.0 mils.

A layer of the flexible expanded graphite sheet was manually pulled away from the film substrate, leaving a remainder layer of the sheet adhered to the film. The thickness of the remainder layer and the film substrate was measured with a micrometer and the thickness of the remainder layer was determined to be 2.5 mils. A second piece of the film was then uniformly adhered to the exposed surface of the remainder layer. The film substrates were then manually separated with a manual force sufficient to separate the remainder layer of the flexible expanded graphite into two new remainder layers, one adhered to each film. The thicknesses of the layers were determined to be 1.2 mils and 1.3 mils, respectively.

A third film was similarly adhered to the 1.2 mils remainder layer and the manual separation of the substrates was again performed, resulting in remainder layers of 0.5 mils and 0.6 mils. The 0.5 mils remainder layer was then similarly adhered with a fourth piece of film and the manual separation of the substrates was performed. The resulting remainder layers were both 0.25 mils in thickness. The method was then repeated, resulting in remainder layers of 0.1 mils in thickness.

Similarly, selected remainder layers having various thicknesses described above were treated by the one-layer method and/or the two-layer method until separate remainder layers having thicknesses of 0.1 mils, 0.75 mils, 1.5 mils, respectively, were obtained.

The resistance in ohms of the respective 18 in.×4 in. ultra-thin flexible graphite foils adhered to the respective remainder layers was calculated by known methods, using the equations described above and voltmeter and ammeter measurements and compared to the resistance of a 3 mils commercially available flexible expanded graphite foil adhered to the same substrate in the same manner as described above.

Figure 7:
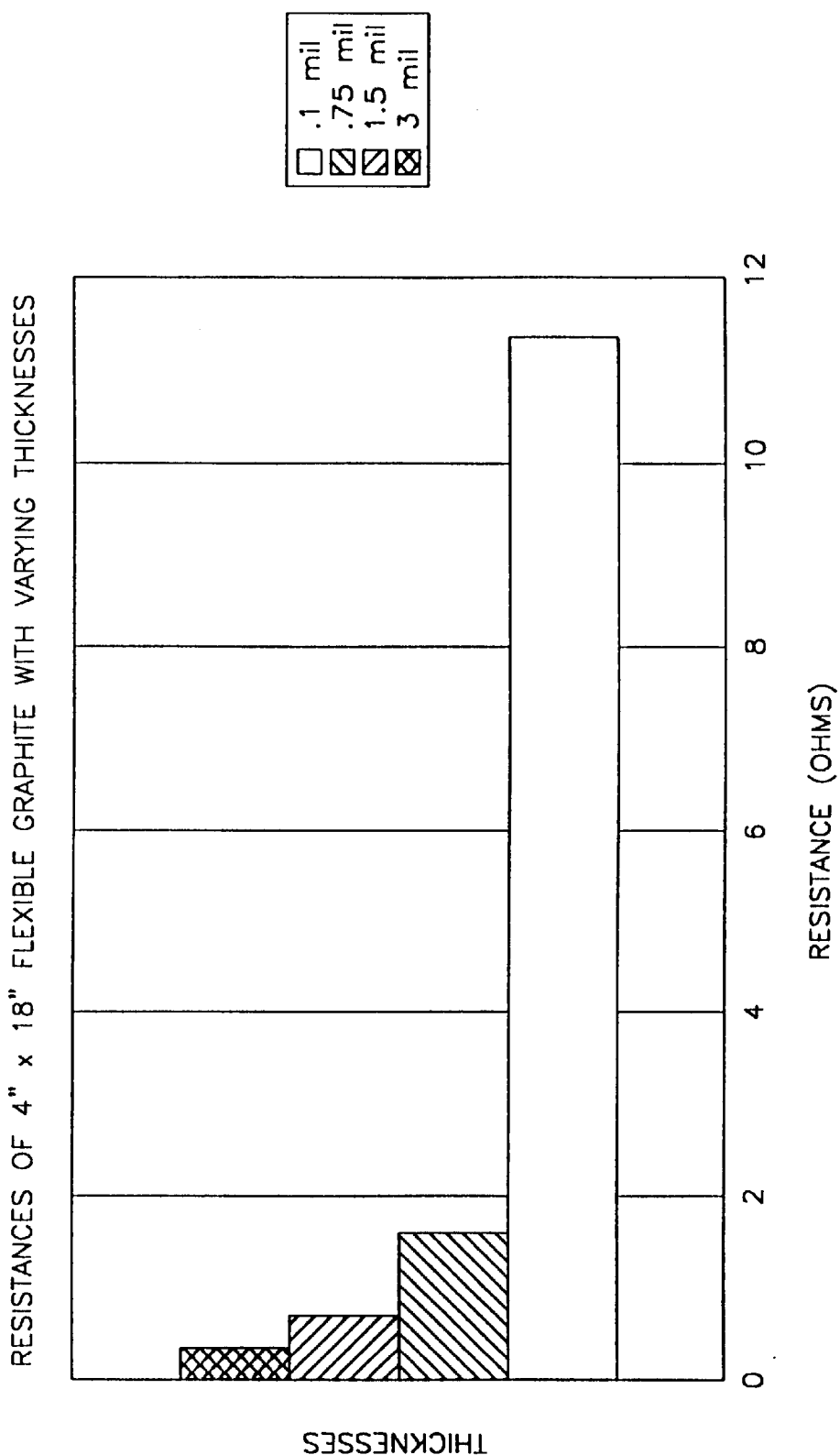
FIG. 7 illustrates the effect of various thicknesses on the electrical resistance of a 4×18 inch flexible expanded graphite foil sheet.

The results, shown in FIG. 7, illustrate the significant increase in resistance that is achieved by decreasing the thickness of the foil by the methods of the invention. For example, the foil having a thickness of 0.1 mils has a resistance that is more than 22 times the resistance of the comparison 3 mils foil. Moreover, the resistance of the 1.5 mils foil and the 0.75 foil is about 2 times and about 4 times, respectively, that of the comparison 3 mils foil.

Example 4

Figure 8:
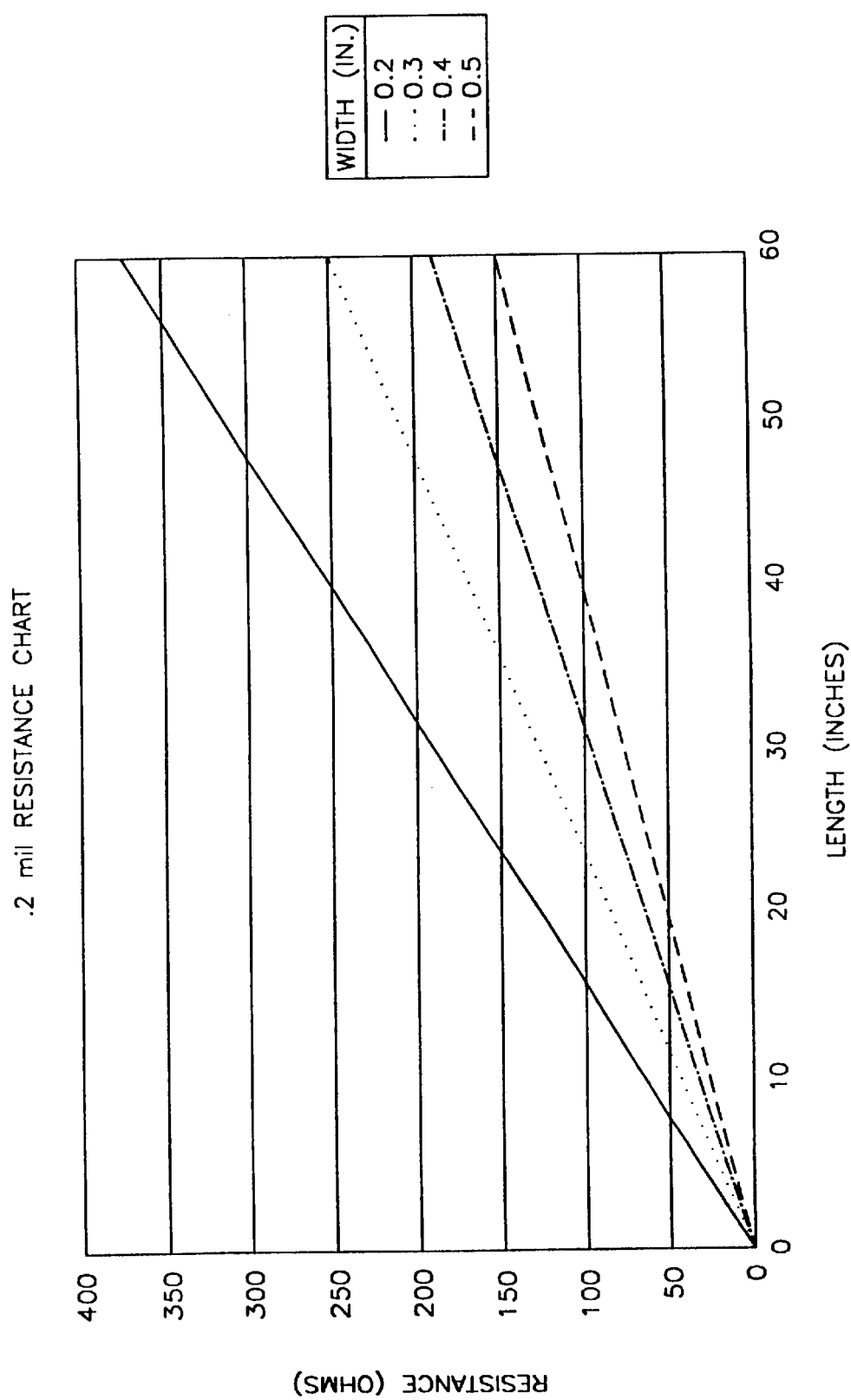
FIG. 8 illustrates the relationship between the electrical resistance of a 0.2 mils thickness flexible expanded graphite foil sheet and the length and width of the sheet.

The method of Example 3 was repeated for individual flexible expanded graphite foil sheets having a density of 70 lbs./ft³, a thickness of 5 mils, and various combinations of lengths ranging from 5 to 60 inches, and widths ranging from 0.2 to 0.5 inches. Remainder layers of the foil were obtained for each length and width combination and having a thickness of 0.2 mils. The resistance in ohms was measured for each foil layer, and the results are illustrated in FIG. 8. The results show the significant increase in resistance of the ultra-thin flexible expanded graphite foil sheet having a given thickness, as the length increases and/or width of the sheet decreases. The resistance of the ultra-thin flexible expanded graphite sheet, produced according to the methods of the invention, can thus be selected by the selecting the proper thickness, length and width of the remainder material.

Example 5

A flexible expanded graphite foil sheet having a length and width of 30 in. and 5 in., respectively, and having a non-uniform thickness is used as a heating element in a heater having a configuration such as that illustrated in FIG. 8. The heater requires 10 watts/in.² and 220 VAC. Zones 1 and 2 each have a length of 30 in. and a width of 2 inches. Zone 2 has a length of 30 in. and a width of 1 inch. A single set of terminals connects zones 1, 2 and 3 to a power source. The required wattage for each of zones 1 and 2 is 600 watts, and for zone 3 is 300 watts. From the equations above, the thickness requirements for each of zones 1 and 2 are 0.55 mils, and of zone 3 is 0.06 mils.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have elements that do not differ from the literal language of the claims, or if they include equivalent elements with insubstantial differences from the literal language of the claims.

We claim:

1. An ultra-thin flexible expanded graphite heating element having a thickness of about 0.01 mils to about 2 mils, wherein the heating element is one of at least two flexible expanded graphite layers obtained by separating a flexible expanded graphite sheet having a first thickness into two or more thickness layers, the heating element being produced by a method comprising the steps of:
    (a) providing a flexible expanded graphite sheet having a first thickness and a surface adhered to a substrate;
    (b) pulling apart the sheet and the substrate with a force sufficient to separate the adhered flexible expanded graphite sheet into a removed thickness layer and a remainder thickness layer adhered to the substrate; and
    (c) optionally repeating steps (a) and (b) until the remainder thickness layer has a thickness of about 0.01 mils to about 2 mils.

2. The heating element of claim 1, wherein the thickness of the remainder layer is substantially uniform.

3. The heating element of claim 1, wherein the thickness of the remainder layer is non-uniform.

4. The heating element of claim 1, wherein the substrate is electrically insulating.

5. An ultra-thin flexible expanded graphite heating element having a thickness of about 0.01 mils to about 2 mils, wherein the heating element is one of at least two flexible expanded graphite layers obtained by separating a flexible expanded graphite sheet having a first thickness into two or more thickness layers, the heating element being produced by a method comprising tile steps of:
    (a) providing a flexible expanded graphite sheet having a first thickness and a top surface, and a bottom surface adhered to a first substrate;
    (b) adhering a second substrate to the top surface; and
    (c) separating the first and second substrates with a force sufficient to separate the flexible expanded graphite sheet into a first remainder thickness layer adhered to the first substrate and a second remainder thickness layer adhered to the second substrate; and
    (d) optionally repeating steps (a), (b) and (c) until at least one of the remainder thickness layers has a thickness of about 0.01 mils to about 2 mils.

6. The heating element of claim 5, wherein the thicknesses of the remainder layers are independent and are substantially uniform.

7. The heating element of claim 5, wherein the thicknesses of the remainder layers are independent and non-uniform.

8. The heating element of claim 5, wherein at least one of the substrates is electrically insulating.

9. An ultra-thin flexible expanded graphite heating element having a non-uniform thickness wherein at least a portion of the element has a thickness of about 0.01 mils to about 2 mils, wherein the heating element is one of at least two flexible expanded graphite layers obtained by separating a flexible expanded graphite sheet having a first thickness into two or more non-uniform thickness layers, the heating element being produced by a method comprising the steps of:
    (a) providing a flexible expanded graphite sheet having a first thickness and a top surface, and a bottom surface adhered to a first substrate;
    (b) non-uniformly adhering a second substrate to the top surface; and
    (c) separating the first and second substrates with a force sufficient to separate the flexible expanded graphite sheet into a first remainder thickness layer adhered to the first substrate and a second remainder thickness layer adhered to the second substrate; and
    (d) optionally repeating steps (a), (b) and (c) until at least a portion of one of the remainder layers has thickness of about 0.01 mils to about 2 mils.

10. The heating element of claim 9, wherein the thicknesses of the remainder layers are independently non-uniform.

11. The heating element of claim 9, wherein at least one of the substrates is electrically insulating.

12. An ultra-thin flexible expanded graphite sheet having a thickness of about 0.01 mils to about 2 mils, wherein the sheet is one of at least two flexible expanded graphite layers obtained by separating a flexible expanded graphite sheet having a first thickness into two or more thickness layers.

13. The sheet of claim 12, wherein the thickness of the ultra-thin sheet is about 0.01 mils to about 1.5 mils.

14. The sheet of claim 12, wherein the thickness of the ultra-thin sheet is about 0.01 mils to about 1 mils.

15. The sheet of claim 12, wherein the thickness of the ultra-thin sheet is about 0.01 mils to about 0.4 mils.

16. The sheet of claim 12, wherein the thickness of the ultra-thin sheet is about 0.01 mils to about 0.1 mils.

17. A method for making an ultra-thin flexible expanded graphite heating element having a thickness of about 0.01 mils to about 2 mils, wherein the heating element is one of at least two flexible expanded graphite layers obtained by separating a flexible expanded graphite sheet having a first thickness into two of more thickness layers, the method, comprising the steps of:
(a) providing a flexible expanded graphite sheet having a first thickness and a surface adhered to a substrate;
(b) pulling apart the sheet and the substrate with a force sufficient to separate the adhered flexible expanded graphite sheet into a removed thickness layer and a remainder thickness layer adhered to the substrate; and
(c) optionally repeating steps (a) and (b) until the remainder thickness layer has a thickness of about 0.01 mils to about 2 mils.

18. The method of claim 17, wherein the thickness of the remainder layer is substantially uniform.

19. The method of claim 17, wherein the thickness of the remainder layer is non-uniform.

20. The method of claim 17, wherein the substrate is electrically insulating.

21. A method for making an ultra-thin flexible expanded graphite heating element having a thickness of about 0.01 mils to about 2 mils, wherein the heating element is one of at least two flexible expanded graphite layers obtained by separating a flexible expanded graphite sheet having a first thickness into two of more thickness layers, the method, comprising the steps of:
(a) providing a flexible expanded graphite sheet having a top surface, and a bottom surface adhered to a first substrate;
(b) adhering a second substrate to the top surface; and
(c) separating the first and second substrates with a force sufficient to separate the flexible expanded graphite sheet into a first remainder thickness layer adhered to the first substrate and a second remainder thickness layer adhered to the second substrate; and
(d) optionally repeating steps (a), (b) and (c) until at least one of the remainder layers has a thickness of about 0.01 mils to about 2 mils.

22. The method of claim 21, wherein the thicknesses of the remainder layers are independent and are substantially uniform.

23. The method of claim 21, wherein the thicknesses of the remainder layers are independent and non-uniform.

24. The method of claim 21, wherein at least one of the substrates is electrically insulating.

25. A method for making an ultra-thin flexible expanded graphite heating element having a non-uniform thickness wherein at least a portion of the element has a thickness of about 0.01 mils to about 2 mils, wherein the heating element is one of at least two flexible expanded graphite layers obtained by separating a flexible expanded graphite sheet having a first thickness into two or more non-uniform thickness layers, the method, comprising the steps of:
(a) providing a flexible expanded graphite sheet having a top surface, and a bottom surface adhered to a first substrate;
(b) non-uniformly adhering a second substrate to the top surface; and
(c) separating the first and second substrates with a force sufficient to separate the flexible expanded graphite sheet into a first remainder thickness layer adhered to the first substrate and a second remainder thickness layer adhered to the second substrate; and
(d) optionally repeating steps (a), (b) and (c) until at least a portion of one of the remainder as thickness of about 0.01 mils to about 2 mils.

26. The method of claim 25, wherein the thicknesses of the remainder layers are independently non-uniform.

27. The method of claim 25, wherein at least one of the substrates is electrically insulating.

* * * * *

UNITED STATES PATENT AND TRADEMARK OFFICE
CERTIFICATE OF CORRECTION

PATENT NO.     : 6,667,100 B2
DATED          : December 23, 2003
INVENTOR(S)    : Robert B. Rutherford and Richard L. Dudman It is certified that error appears in the above-identified patent and that said Letters Patent is hereby corrected as shown below:

Column 12,
Line 2, change "tile" to -- the --

Column 13,
Line 24, change "of" to -- or --
Line 36, after "remainder" add -- thickness --

Column 14,
Line 30, after "remainder" add -- layers --
Line 30, change "as" to -- has --

Signed and Sealed this

Ninth Day of March, 2004

JON W. DUDAS
*Acting Director of the United States Patent and Trademark Office*